Aug. 30, 1960    M. S. BROWN    2,950,561
MOLE TRAP
Filed Feb. 14, 1958    2 Sheets-Sheet 1

INVENTOR.
Milton S. Brown
BY Victor J. Evans & Co.
ATTORNEYS

Aug. 30, 1960  M. S. BROWN  2,950,561
MOLE TRAP
Filed Feb. 14, 1958  2 Sheets-Sheet 2
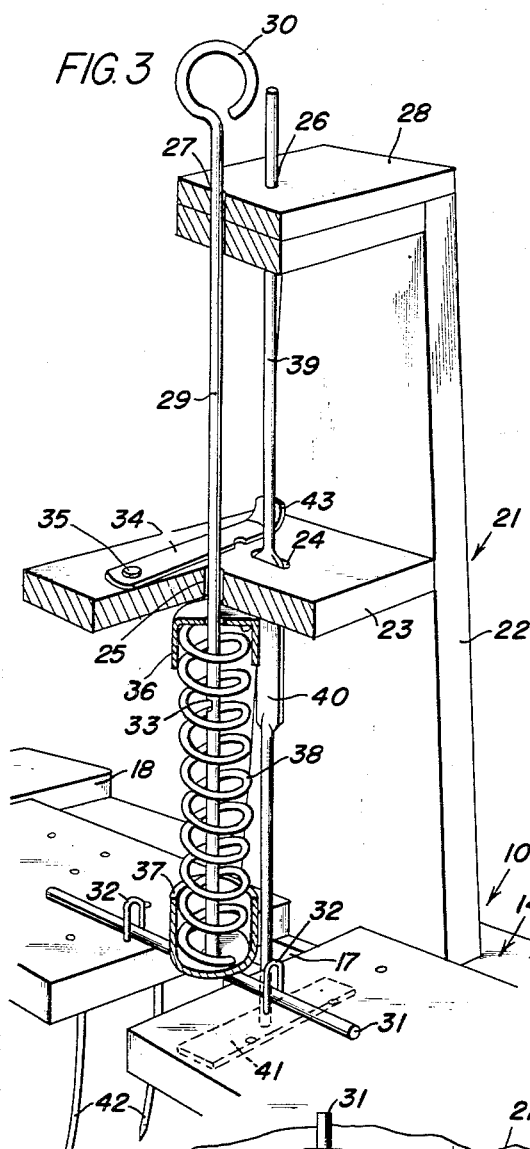
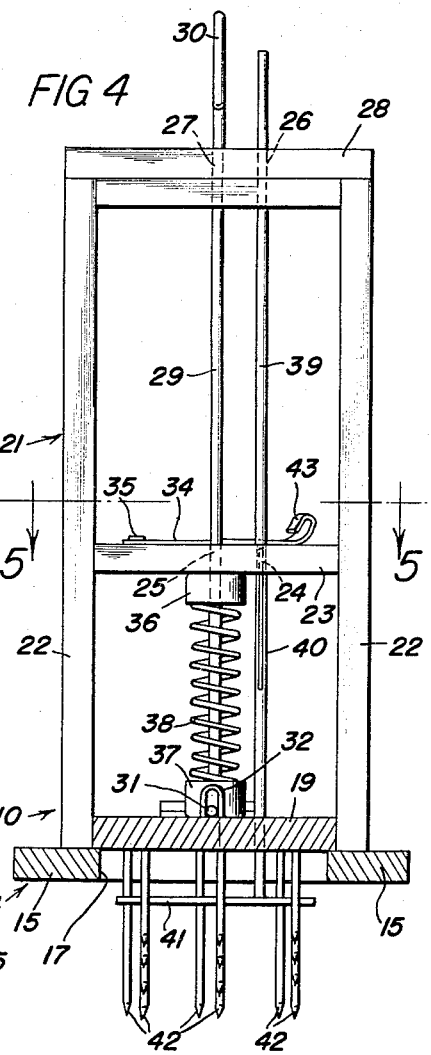
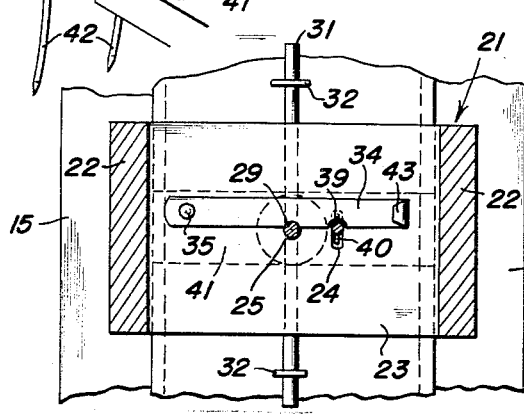
INVENTOR.
Milton S. Brown
BY Victor J. Evans & Co.
ATTORNEYS 2,950,561
Patented Aug. 30, 1960

United States Patent Office

2,950,561
MOLE TRAP

Milton S. Brown, Warrenton, N.C., assignor of one-fourth to Thurston Brown, Warrenton, and one-fourth to Lafayette Brown, Macon, N.C.

Filed Feb. 14, 1958, Ser. No. 715,385

2 Claims. (Cl. 43—81)

This invention relates to a trap, and more particularly to a trap for use in catching moles.

The object of the invention is to provide a trap which is adapted to be arranged contiguous to a tunnel or the like so that as a mole moves through the tunnel in the ground, the trap will be set off whereby the mole will be caught so that the mole cannot live to destroy roots, crops, lawns or the like.

Another object of the invention is to provide a mole trap which is adapted to be arranged over a portion of the ground in which moles are known to frequent, and wherein the trap can be readily manually set whereby when the mole moves through a tunnel or moves through a portion of the ground, a trigger will be actuated to spring the trap whereby a plurality of prongs or impaling elements will be moved downwardly to impale the mole thereon.

A further object of the invention is to provide a mole trap which is extremely simple and inexpensive to manufacture.

Other objects and advantages will be apparent during the course of the following description.

In the accompanying drawings, forming a part of this application, and in which like numerals are used to designate like parts throughout the same.

Figure 3 is a fragmentary perspective view of the mole trap.

Figure 4 is a sectional view taken on the line 4—4 of Figure 1.

Figure 5 is a sectional view taken on the line 5—5 of Figure 4.

Figures 1, 2:
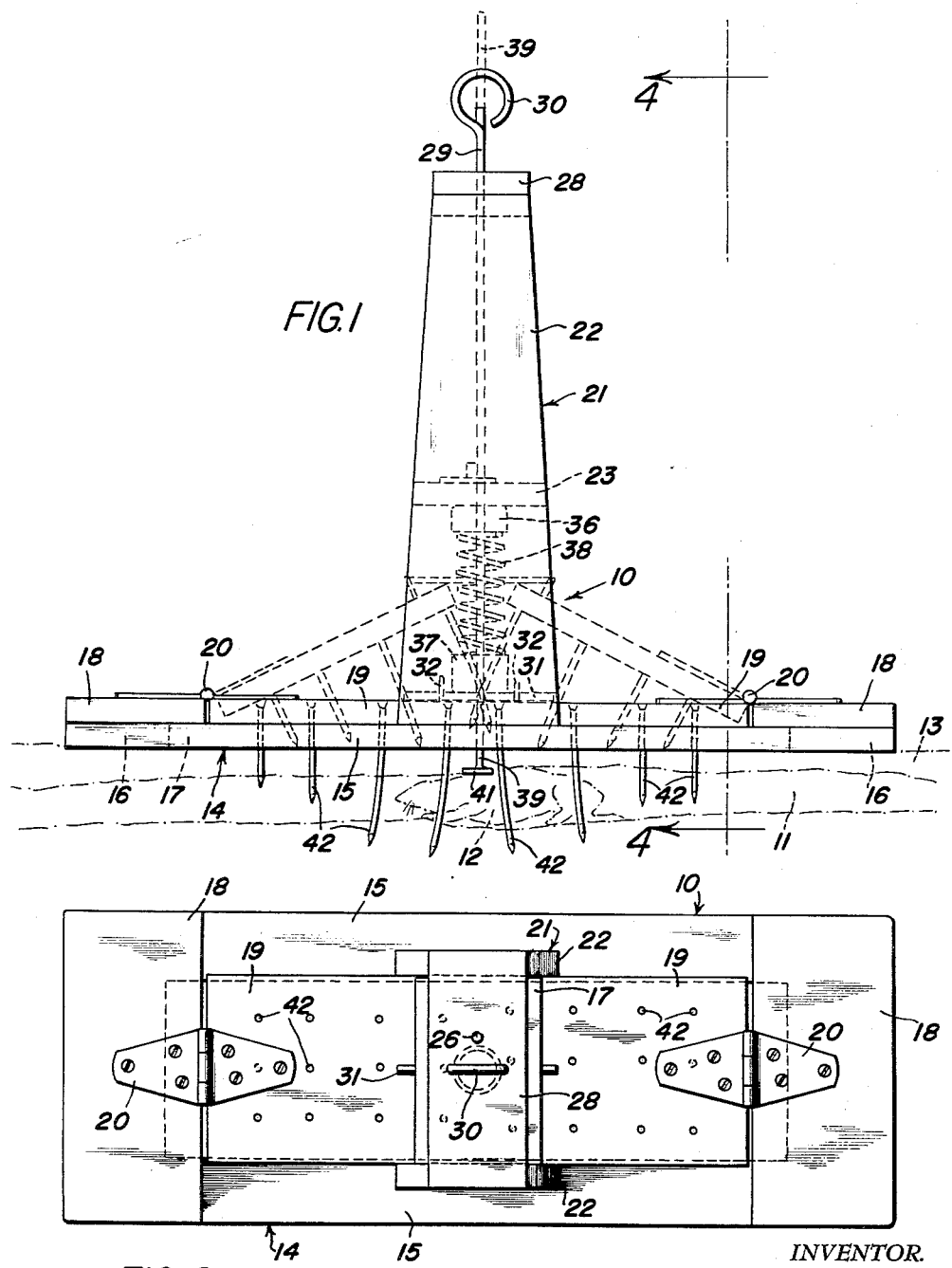
Figure 1 is a side elevational view illustrating the mole trap of the present invention.
Figure 2 is a top plan view of the mole trap.

Referring in detail to the drawings, the numeral 10 indicates the trap of the present invention, and the trap 10 is adapted to be used for catching or impaling moles such as the mole 12 shown in broken lines in Figure 1, and the mole 12 is adapted to be caught as it moves through a tunnel such as the tunnel 11 which is in the ground 13.

The trap 10 of the present invention includes a horizontally disposed rectangular base which is indicated generally by the numeral 14, and the base 14 includes a pair of spaced parallel side members 15 and a pair of spaced parallel end members 16, and the members 15 and 16 coact to define therebetween an open space 17. An end piece 18 is secured above each end member 16 in any suitable manner.

There is further provided a pair of similar blocks 19, and the blocks 19 are hingedly connected to the end pieces 18 by means of hinges 20.

The numeral 21 indicates an open frame which extends upwardly from the base 14 and which is secured thereto, and the frame 21 includes a pair of spaced apart vertically disposed side walls 22 which have their lower ends secured to the side members 15 of the base 14. Extending between the pair of side walls 22 and secured thereto is a horizontally disposed crosspiece 23 which is provided with a slot 24 and an aperture or opening 25, Figure 3. Secured to the upper ends of the side walls 22 is a horizontally disposed top piece 28 which is provided with openings 26 and 27 therein. The numeral 29 indicates a vertically shiftable rod which extends through the registering openings 27 and 25, and a finger piece or hand grip 30 is arranged on the upper end of the rod 29. The numeral 31 indicates a pin which is secured as by welding to the lower end of the rod 29, and the pin 31 projects through a pair of U-shaped brackets or clips 32, the brackets 32 extending upwardly from the inner ends of the blocks 19 and being secured thereto. As shown in the drawings, the rod 29 is provided with a notch 33 which is arranged intermediate the ends of the rod 29, and the numeral 34 indicates a latch which is pivotally connected to the crosspiece 23 by means of a pivot pin 35, the latch 34 being mounted for movement into and out of engagement with the notch 33 so that the rod 29 can be selectively maintained in a raised position.

The trap of the present invention is further provided with upper and lower cup-like members 36 and 37, and a coil spring 38 is circumposed on the rod 29, the spring 38 being interposed between the cup-like members 36 and 37.

The numeral 39 indicates a vertically shiftable or movable arm which has its upper portion projecting through the opening 26 in the top piece 28, and the arm 39 further includes an intermediate widened portion 40 which is movably mounted in the slot 24 of the crosspiece 23, the widened portion 40 adapted to selectively engage the latch 34 so as to move the latch 34 out of engagement with the notch 33 whereby the spring 38 can quickly force the blocks 19 downwardly so that prongs or impaling elements 42 will be driven into engagement with a mole such as the mole 12. The numeral 41 indicates a plate which is secured to the lower end of the arm 39, and the plate 41 defines a trigger which is adapted to be actuated by pressure from the ground as the mole 12 moves through the ground or through the tunnel.

As shown in Figure 4 for example, the latch 34 is provided with a finger piece 43 so that when the trap is to be reset, the finger piece 43 can be readily gripped to pivot the latch 34 into locking position with respect to the notch 33.

From the foregoing, it is apparent that there has been provided a trap which is especially suitable for use in catching and killing moles such as the mole 12. In use, the trap 10 is adapted to be positioned over a portion of the ground 13 in which moles frequent, and the trap 10 may be arranged so that its base 14 is positioned over the tunnel 11 through which the mole 12 travels. Then, the handle 30 is gripped, and to set the trap, the handle 30 is raised upwardly which lifts the rod 29 and this moves the pin 31 upwardly and since the pin 31 extends through the brackets 32 which are connected to the blocks 19, it will be seen that this upward movement of the rod 29 will cause upward pivotal movement of the blocks 19 about the hinges 20. When the rod 29 has been moved to the raised position, the latch 34 is swung on its pivot pin 35 by means of the finger piece 43 so that the latch 34 moves into engagement with the notch 33, and then pressure on the handle 30 is released and the latch 34 will retain the rod 29 in its raised position since the latch 34 engages the notch 33. Then, with the trap set over the tunnel as for example as shown in Figure 1, it will be seen that as the mole 12 moves through the tunnel 11, the mole will cause the top of the tunnel to exert a pressure on the trigger or plate 41 so as to cause an upward movement of the trigger plate 41 and this will raise the arm 39. As the arm 39 moves upwardly, the widened portion 40 will move into engagement with the latch 34 so as to pivot the latch 34 on the pin 35 whereby the latch 34 will move out of engagement with the notch 33 and this will permit the coil spring 38 to quickly move the cup 37 and its associated parts downwardly. As the cup 37 moves downwardly, the pin 31 moves downwardly and this causes a quick downward thrust of the pair of blocks 19. Since the plurality of prongs 42 are carried by each block 19, it will be seen that this downward movement of the blocks 19 will cause the prongs 42 to become impaled in the mole 12 whereby the mole 12 will be killed or caught.

It is to be noted that the trap can be used over and over again since after a mole has been caught or killed, the trap can be reset and since the device is ruggedly constructed, it will withstand long periods of rough usage in the field or the like.

The parts can be made of any suitable material and in different shapes or sizes.

The teeth or prongs 42 have their lower ends pointed so that these prongs will penetrate the ground and impale themselves in the mole to be killed. Since the trigger 41 has its longitudinal axis arranged at right angles with respect to the longitudinal axis of the base 14, it will be seen that it will be practically impossible for the mole 12 to pass through the tunnel without actuating the trigger 41, since the trigger 41 will extend transversely throughout the entire diameter or width of the tunnel 11.

Minor changes in shape, size and rearrangement of details coming within the field of invention claimed may be resorted to in actual practice, if desired.

I claim:

1. In a trap, a horizontally disposed rectangular base including a pair of spaced parallel side members and a pair of spaced parallel end members, said side and end members defining therebetween an open space, an end piece mounted above each end member, a pair of blocks hingedly connected to said end pieces, a plurality of pointed prongs depending from each of said blocks and connected thereto, said prongs extending through the space in said base, a frame extending upwardly from said base, said frame including a pair of spaced parallel side walls having their lower ends secured to the side members of said base, a horizontally disposed crosspiece extending between said side walls and connected thereto, said crosspiece having a slot and an aperture therein, a horizontally disposed top piece arranged above said crosspiece and connected to the upper ends of said side walls, there being a pair of spaced apart openings in said top piece, a vertically movable rod extending through an opening in the top piece and through the aperture in the crosspiece, there being a notch in said rod intermediate the ends thereof, a latch pivotally connected to said crosspiece and mounted for movement into and out of engagement with the notch in said rod, a pin secured to the lower end of said rod, U-shaped brackets extending upwardly from said blocks and engaged by said pin, upper and lower opposed cup-like members positioned between said crosspiece and pin, a coil spring circumposed on said rod and having its ends engaging said cup-like members, a vertically disposed shiftable arm projecting through an opening in the top piece and said arm having a widened intermediate portion movably projecting through the slot in the crosspiece, said widened portion being mounted for movement into and out of engagement with said latch, and a horizontally disposed plate secured to the lower end of said arm at a point below said frame.

2. The structure as defined in claim 1, and further including a finger piece on the upper end of said rod, said trap being adapted to be used for catching moles.

References Cited in the file of this patent
UNITED STATES PATENTS

| | | |
|---|---|---|
| 1,078,526 | Van Curen | Nov. 11, 1913 |
| 1,456,929 | Moen | May 26, 1923 |
| 1,463,117 | Gilmore et al. | July 24, 1923 |